(12) United States Patent
Sano et al.

(10) Patent No.: US 9,250,325 B2
(45) Date of Patent: Feb. 2, 2016

(54) FLASHER TYPE FISH SONAR

(71) Applicant: Honda Electronics Co., Ltd., Oiwa-cho, Toyohashi-shi, Aichi-ken (JP)

(72) Inventors: Shuichi Sano, Toyohashi (JP); Yoshiki Katayama, Toyohashi (JP)

(73) Assignee: Honda Electronics Co., Ltd., Oiwa-cho, Toyohashi-shi, Aichi-ken (JP)

( * ) Notice: Subject to any disclaimer, the term of this patent is extended or adjusted under 35 U.S.C. 154(b) by 314 days.

(21) Appl. No.: 13/935,951

(22) Filed: Jul. 5, 2013

(65) Prior Publication Data
US 2015/0009781 A1  Jan. 8, 2015

(51) Int. Cl.
*G01S 1/72*  (2006.01)
*G01S 15/96* (2006.01)
*G01S 7/51*  (2006.01)

(52) U.S. Cl.
CPC .. *G01S 15/96* (2013.01); *G01S 7/51* (2013.01)

(58) Field of Classification Search
CPC ............ G01S 15/96; G09F 9/33; G09G 3/005
USPC ......................................................... 367/109
See application file for complete search history.

(56) References Cited

U.S. PATENT DOCUMENTS

2006/0158422 A1* 7/2006 Ryu .............................. 345/110
2009/0141590 A1* 6/2009 Betts et al. .................... 367/111

* cited by examiner

*Primary Examiner* — Luke Ratcliffe
(74) *Attorney, Agent, or Firm* — Richard M. Goldberg

(57) ABSTRACT

A flasher type fish sonar includes a front case in which a display window is formed in front, a rotary disc opposite to the display window rotated by a motor, an ultrasonic transducer for transmitting ultrasonic waves in the water by a control portion and for receiving reflected signals in the water, a display signal transmitting portion for transmitting reflected signals received by the ultrasonic transducer and display data forming formed by the control portion and for transmitting the same to the rotary disc, a display control portion attached to the rotary disc, a fish sonar display portion displayed by light emitting diodes attached near an edge of the rotary disc, and a letter illustration numeral display portion displayed by light emitting diodes inside of center portion of the rotary disc.

6 Claims, 11 Drawing Sheets

FLASHER TYPE FISH SONAR

BACKGROUND OF THE INVENTON

The present invention relates to a flasher type fish sonar having light emitting diodes for displaying, a receiving portion for receiving display signals, a power supplying portion, and a control device mounted on the rotary disk.

In prior flasher type fish sonar, a display disk comprises a circular window formed at a front of a case, and a luminous body is mounted on a rotary disk opposite to the circular window. The rotary disk is rotated by a motor, slip rings are attached to a rotary shaft of the rotary disk, and brushes contact with the slip rings. An input circuit is connected to the brushes, a control circuit is connected to the input circuit, and an oscillating circuit and a receiving circuit are connected to the control circuit and an ultrasonic transducer.

When oscillating signals are input from the control circuit to the oscillating circuit, oscillating outputs are input from the oscillating circuit to the ultrasonic transducer, and ultrasonic waves are emitted from the ultrasonic vibrator to the water. Reflected ultrasonic waves from the water are received by the ultrasonic transducer, and reflected signals from the ultrasonic transducer are amplified by the receiving circuit and are input from the control circuit to the input circuit. By the reflected signals applied to the input circuit, luminous power is input the luminous body through the brushes and slip rings from the input circuit. A portion A displayed on the circle window is a start point of a luminosity which shows a surface of the sea, a portion B shows fish, a portion C shows a first bottom echo of the sea, and a portion D shows a second bottom echo of the sea. Also, due to a set of an operating portion, letter character signals are converted to display signals by a control circuit, are input to an input device of a display device and are input to the light emitting diodes. Therefore, letter characters are displayed in the window of the display device.

However, in the prior flasher type fish sonar, because the light emitting diodes are emitted with different timings, brushes and slip rings the same in number as the light emitting diodes are necessary.

SUMMARY OF THE INVENTON

It is, therefore, the primary object of the present invention to provide a flasher type fish sonar in which three brushes and slip rings are used for a power supply, for ground and for displaying data.

It is a second object of the present invention to provide a flasher type fish sonar in which electromagnetic coupling is used for a power supply and the ground, and light serial communication is used for displaying data.

It is a third object of the present invention to provide a flasher type fish sonar in which an electric wave is used for displaying data, In order to accomplish the above and other objects, the present invention comprises a timing forming portion for outputting timing signals, a transmitting portion for outputting transmitting signals, an ultrasonic transducer for transmitting ultrasonic waves in the water and for receiving reflection waves from the water, a receiving portion for amplifying the reflection waves, an A/D converter for converting reflection waves to digital signals, a first buffer memory for memorizing the reflection waves from the A/D converter once, a sea bottom detecting portion for detecting the sea bottom by the reflection waves from the first buffer memory, a display data forming portion for converting the reflection signals to display data, a second buffer memory for memorizing the display signals from the display data forming portion, a display letter data memorizing portion for supplying display letter data to the display data forming portion, a display signal transmitting portion for transmitting the reflection signals from the first buffer memory and the display data from the second buffer memory, a display control portion for supplying the display signals from the display data signal transmitting portion and mounted to a rotary disc rotated by a motor, a fish sonar signal display portion for displaying a fish sonar signal from the display control portion by light emitting diodes mounted on the edge of the rotary disc, and a letter displaying portion for displaying display letter data from the display control portion by light emitting diodes mounted inside of the light emitting diodes of the edge of rotary disc.

BREIF DESCRIPTION OF THE DRAWINGS

FIG. 4 (*b*) shows a front view of a display portion of the flasher type fish sonar for displaying the letter character signals in FIG. 1.

DESCRIPTION OF THE PREFERRED EMBODIMENT

Figure 1:
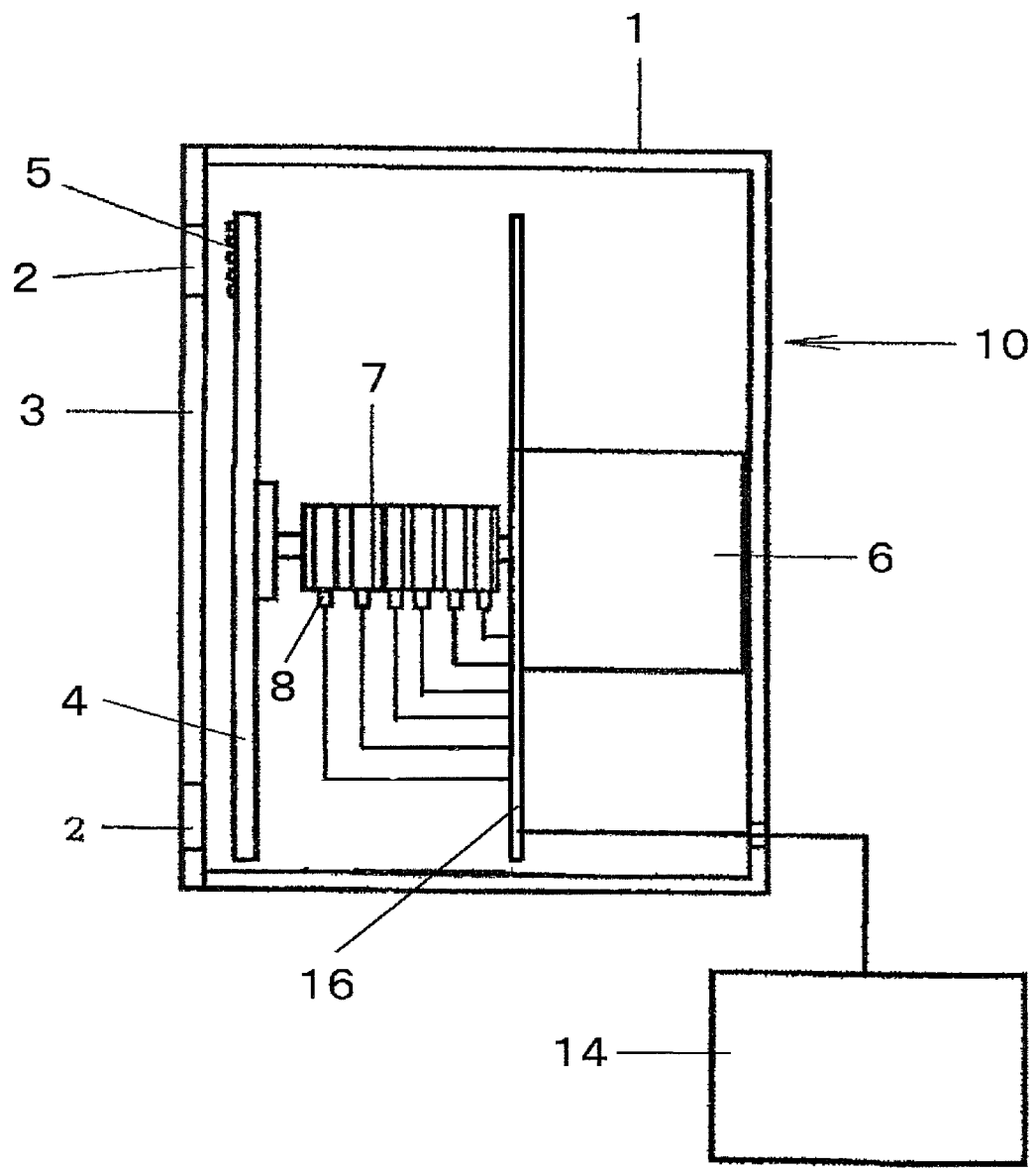
FIG. 1 shows a sectional view of a prior flasher type fish sonar.
Figure 2:
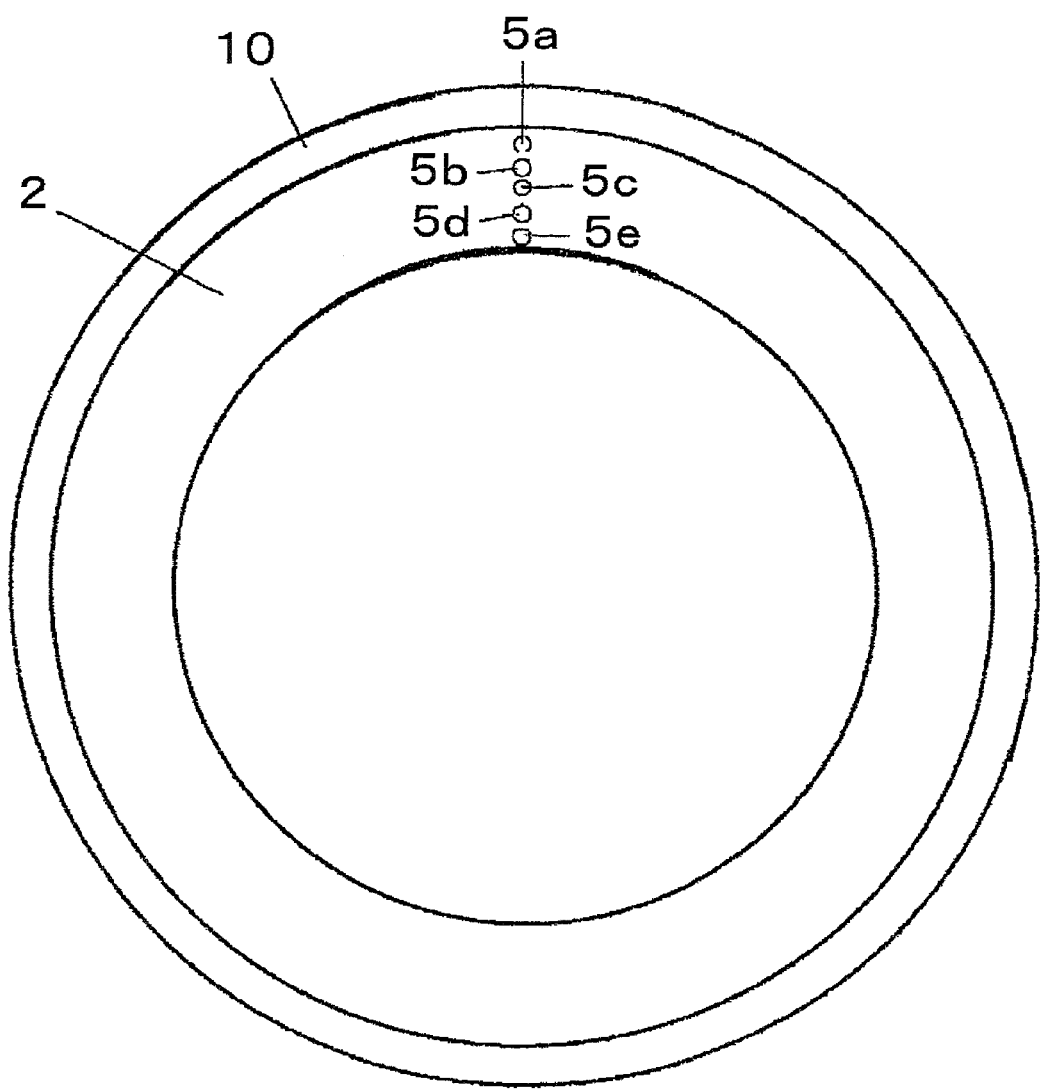
FIG. 2 shows a display portion of the flasher type fish sonar in FIG. 1.
Figure 3:
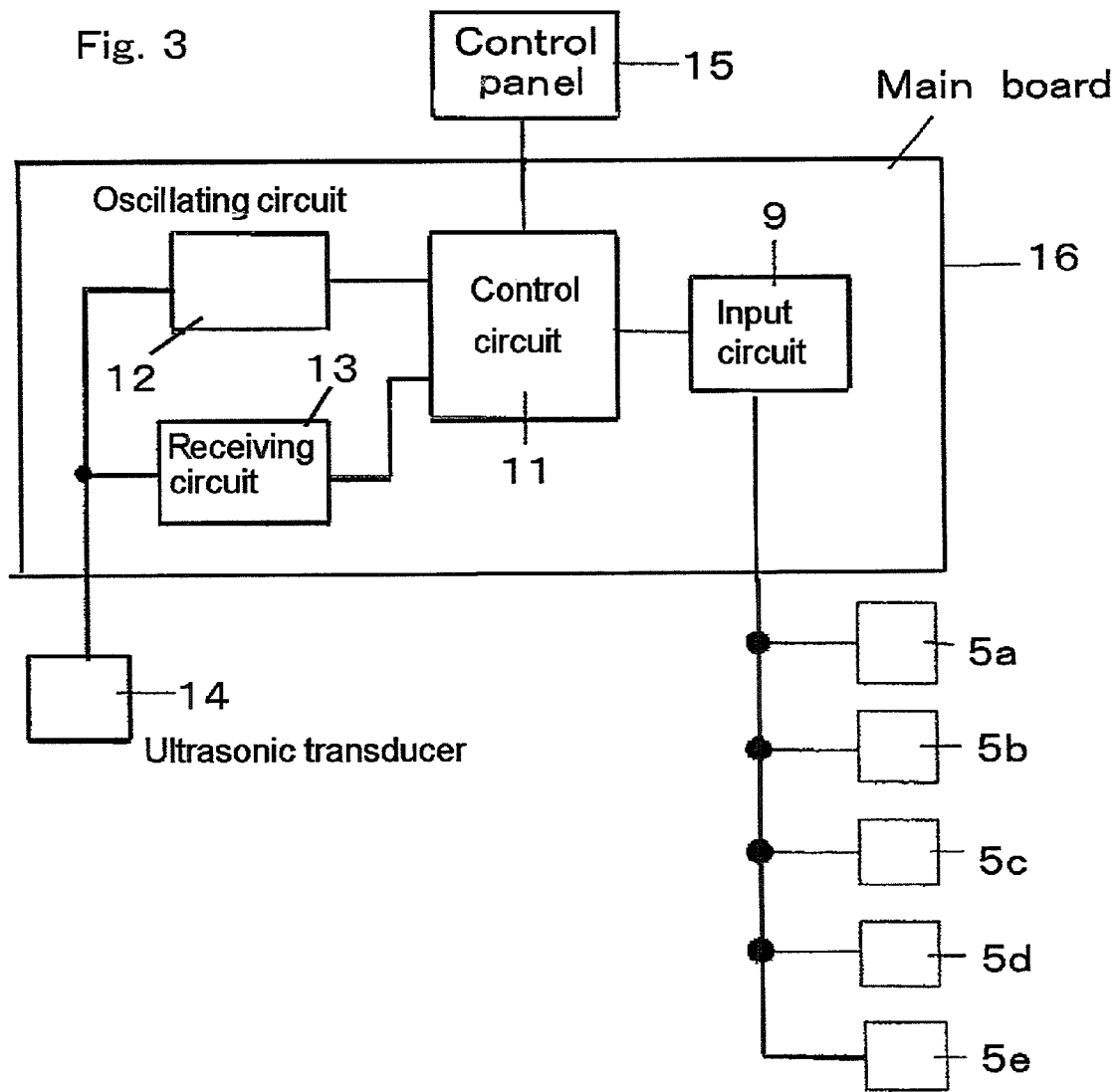
FIG. 3 shows a block diagram of the prior flasher type fish sonar.

In a prior flasher type fish sonar, as shown in FIG. 1 and FIG. 2, a display disk 3 formed with a circular window 2 is formed at a front of a case 1, light emitting diodes 5*a*, 5*b*, 5*c*, 5*d* and 5*e* are mounted to a rotary disk 4 opposite to the circular window 2. The rotary disk 4 is rotated by a motor 6 mounted to a main board 16, and brushes 8 are contacted by slip rings 7 attached to a rotary shaft of the rotary disk 4, whereby an input circuit 9 is constructed. The input circuit 9 is connected to the control circuit 11 mounted to the main board 16, whereby a display device 10 is constructed. As shown in FIG. 3, an oscillating circuit 12 and a receiving circuit 13 are connected to the control circuit 11 of the display device 10, and an ultrasonic transducer 14 is connected to the oscillating circuit 12 and the receiving circuit 13. When the oscillating signals from the control circuit 11 are supplied to the oscillating circuit 12, the oscillating signals are supplied to the ultrasonic transducer 14, ultrasonic waves are emitted in the water from the ultrasonic transducer 14. Reflected waves of the ultrasonic waves from the water are received by the ultrasonic transducer 14, are amplified by the receiving circuit 13 and are supplied to the control circuit 11. When the reflected signals from the control circuit 11 are supplied to the light emitting diodes 5a, 5b, 5c. 5d and 5e through the brushes 8 and the slip rings 7 from the input circuit 9 as light emitting power, as shown in FIG. 4(a), a portion A displayed on the circular window of the display device 10 is a start point of a luminosity which shows a surface of the sea, a portion B shows fish, a portion C shows a first bottom echo of the sea, and a portion D shows a second bottom echo of the sea.

Figure 4:
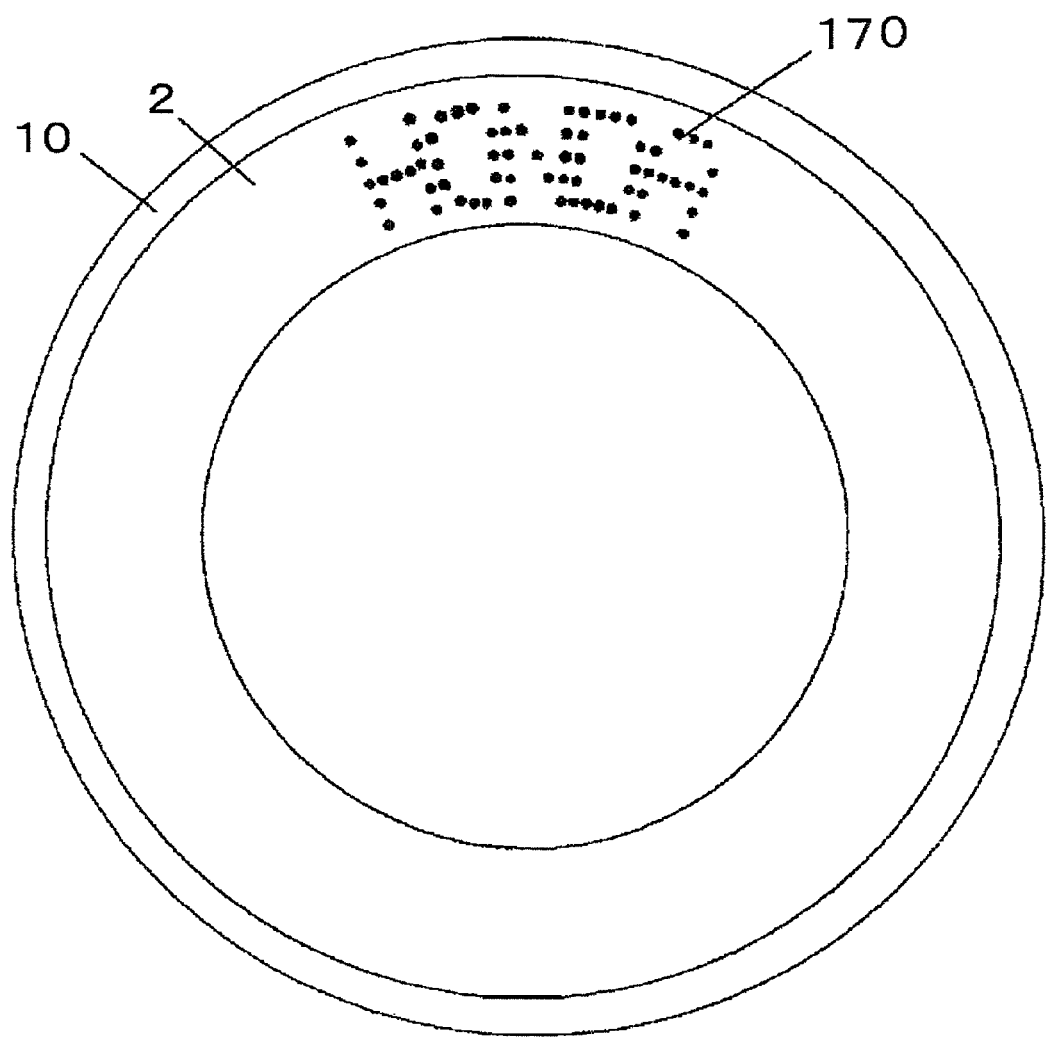
FIG. 4 (*a*) shows a front view of a display portion of the flasher type fish sonar for displaying fish sonar displaying signals in FIG. 1.
Figure 4:
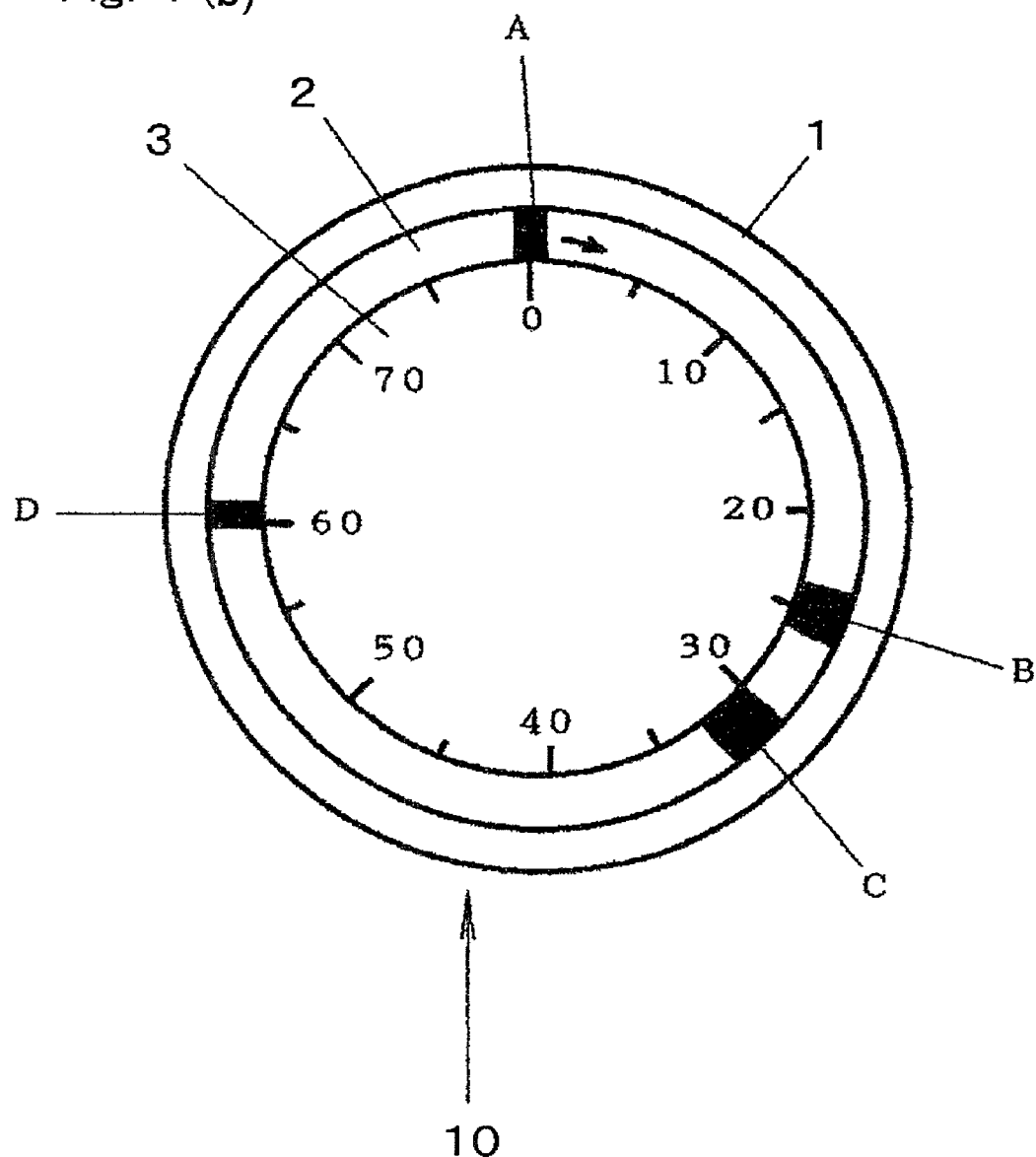

When letter character signals are supplied by a control panel to the control circuit 11, the letter character signals are converted to the display signals, the display signals of the letter character signals are supplied to the light emitting diodes 5a, 5b, 5c. 5d and 5e and as shown in FIG. 4(a), and letter characters 170 are emitted by light.

In the prior flasher type fish sonar, however, because the light emitting diodes of the display device are emitted light in various timings, the slip rings and the brushes of the same number as the light emitting diodes become necessary.

Figure 5:
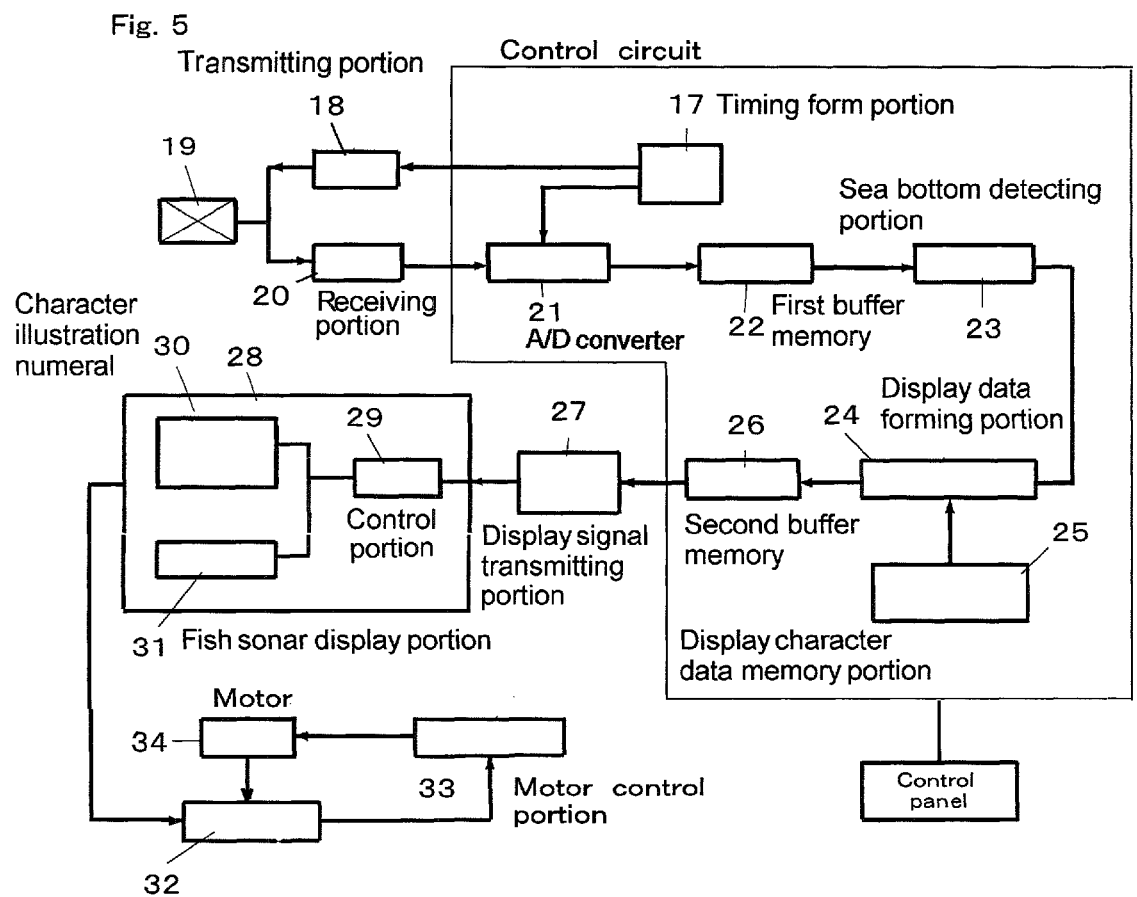
FIG. 5 shows a block diagram of the flasher type fish sonar in the present invention.
Figure 8:
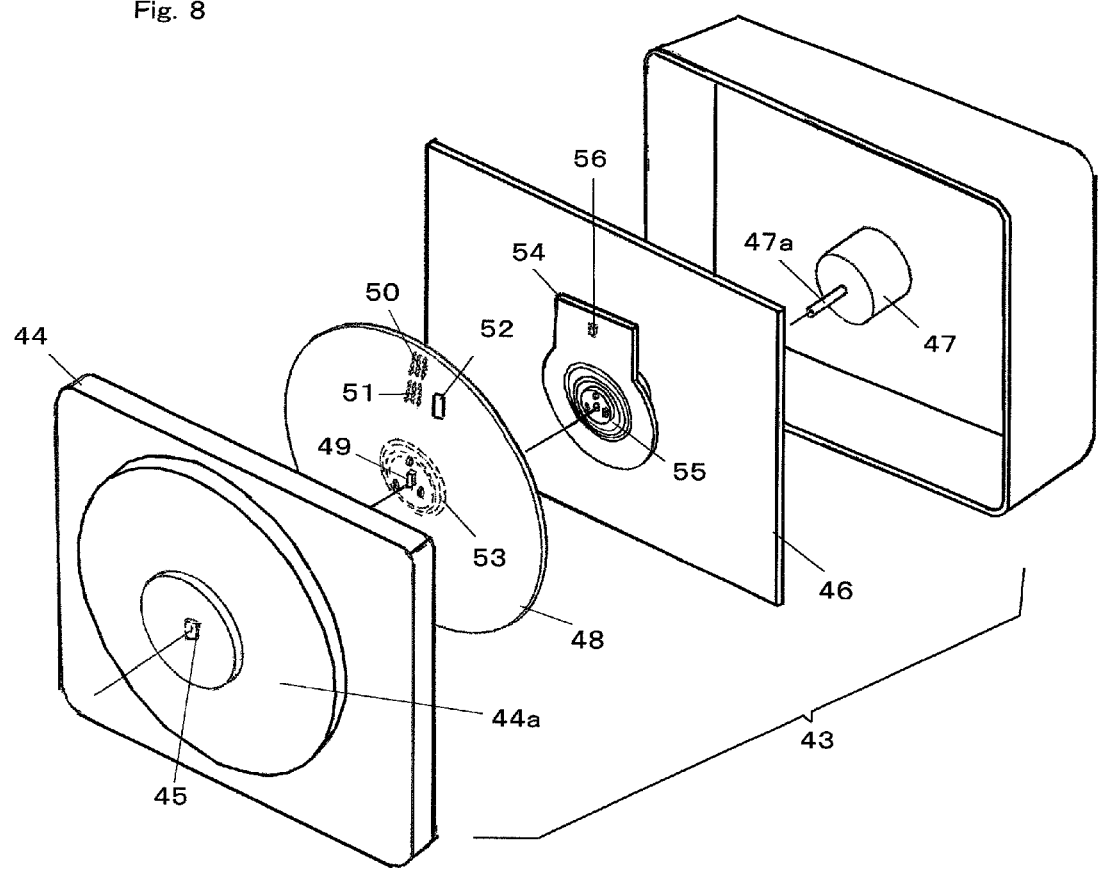
FIG. 8 shows a perspective and blown apart view of the flasher type fish sonar in the second embodiment of the present invention.

FIG. 5 shows a block diagram of a flasher type fish sonar of the present invention. In FIG. 8, a timing forming portion 17, A/D converter 21, a first buffer memory 22, a sea bottom detecting portion 23, a display data forming portion 24, a display letter data memorizing portion 25, and a second buffer memory 26 are constructed the same as the control circuit 11 in FIG. 3.

In the operation of FIG. 5, when timing signals are transmitted from timing forming portion 17 to a transmitting portion 18, oscillation signals are supplied by the transmitting portion 18 to an ultrasonic transducer 19, and ultrasonic waves are emitted to the water from the ultrasonic transducer 19. Therefore, reflected waves reflected by bodies, living things and the sea bottom are received by the ultrasonic transducer 19, and are supplied to a receiving portion 20. The reflected waves supplied to the receiving portion 20 are amplified, the reflected analog signals are converted to reflected digital signals by the A/D converter 21 and are once memorized by the first buffer memory 22.

A sea bottom signal is detected by a sea bottom detecting portion from the reflected digital signals read out from the first buffer memory 22, and is supplied to the display data forming portion 24. The reflected signals from the water, the sea bottom signal and the letter data from the display letter data memorizing portion 25 are converted to display data in the display data forming portion 24 and are once memorized by a second buffer memory 26. The display data read out from the second buffer memory 26 are supplied to a display control portion 29 comprising, for example, a CPU of a display device 28, from a signal transmitting portion 27, letter illustration numeral signals are transmitted to a letter illustration numeral display portion 30 from the display control portion 29, and fish sonar signals are supplied to a fish sonar display portion 31 from the display control portion 29, whereby the light emitting diodes are turned on respectively. The rotation of the rotary disc of the display portion 28 is detected by a rotation detection 32, the detecting rotation number is supplied to a motor control circuit 33, and a motor 34 is set to a predetermined rotation number in response thereto.

Figure 6:
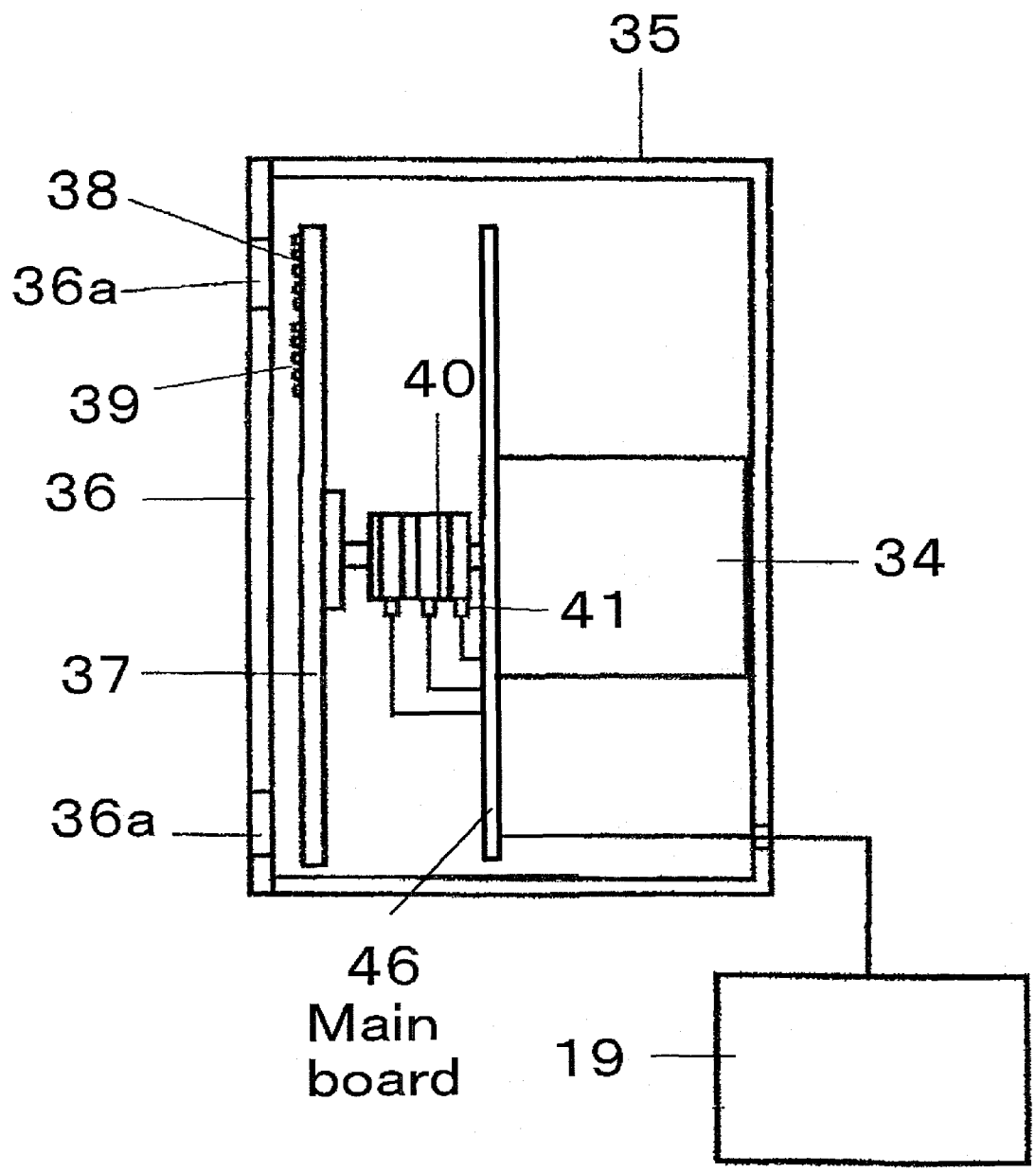
FIG. 6 shows a sectional view of a flasher type fish sonar in the present invention.

As shown in FIG. 6, a display surface 36 having a window 36a is formed in the whole periphery of a front of a display device 35, and a display rotary disc 37 is provided opposite of the display surface 36. Light emitting diodes 38 for the fish sonar are mounted on the display rotary disc 37, and light emitting diodes 39 for the letter illustration numeral signal are mounted inside of light emitting diodes 38. Three slip rings 40 for power supply, for ground and for signal are attached to a rotary shaft of the display rotary disc 37, and brushes 41 contact the slip rings 40, whereby the display signal transmitting portion is formed. The second buffer memory 26 mounted on the main board 46 is connected to the brushes 41.

Figure 7:
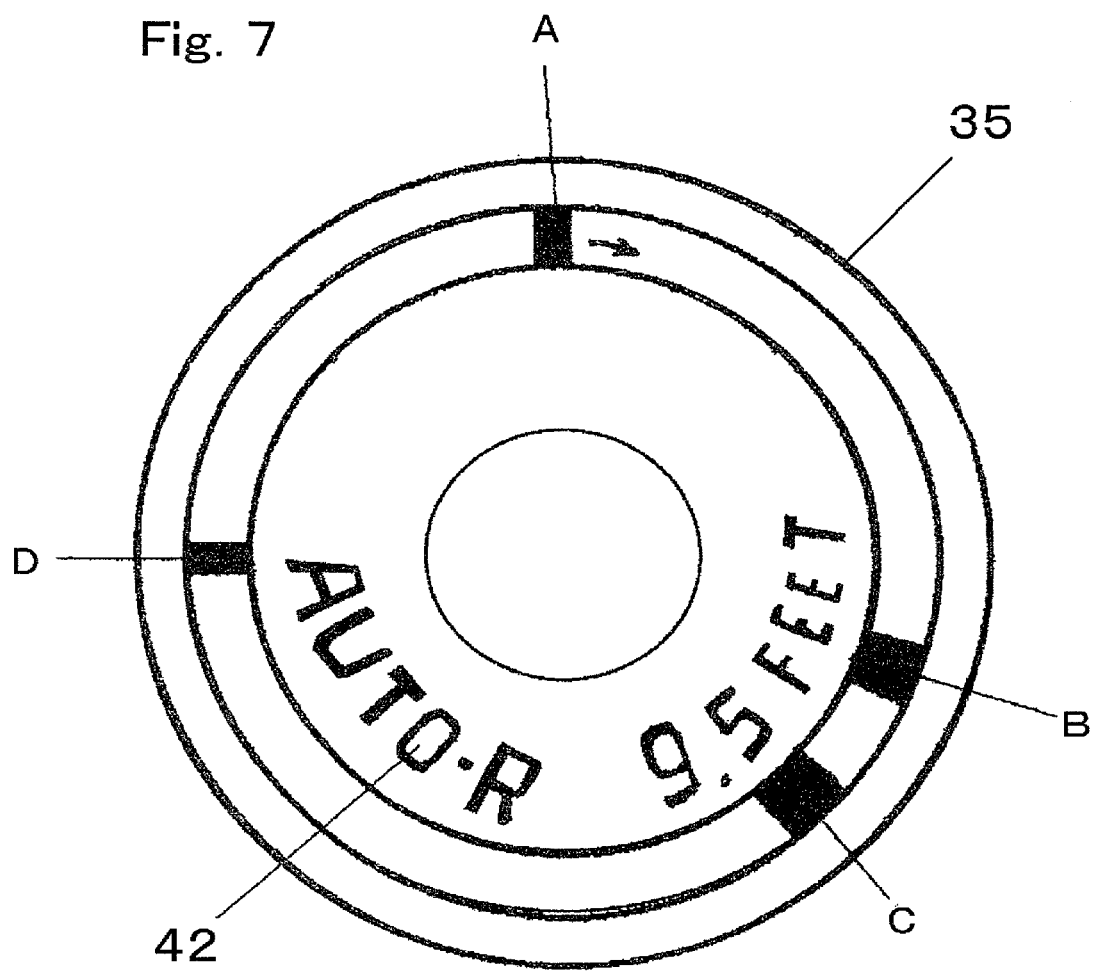
FIG. 7 shows a front view of a display portion of the flasher type fish sonar in the present invention.

As shown in FIG. 7, the fish sonar signals are displayed by the light emitting diodes 38 of the display rotary disc 37 in the display device 35. A portion A becomes the start point of the light emitting diodes 38 for showing the surface of the sea, fish shoal is shown by the portion B, a portion C shows a first reflection in the sea bottom, and a portion D shows a second reflection in the sea bottom. Letters, illustrations and numerals, for example [AUTO-R 9.5 FEET] 42 are show by the light emitting diodes 39 inside of the light emitting diodes 38.

Figure 9:
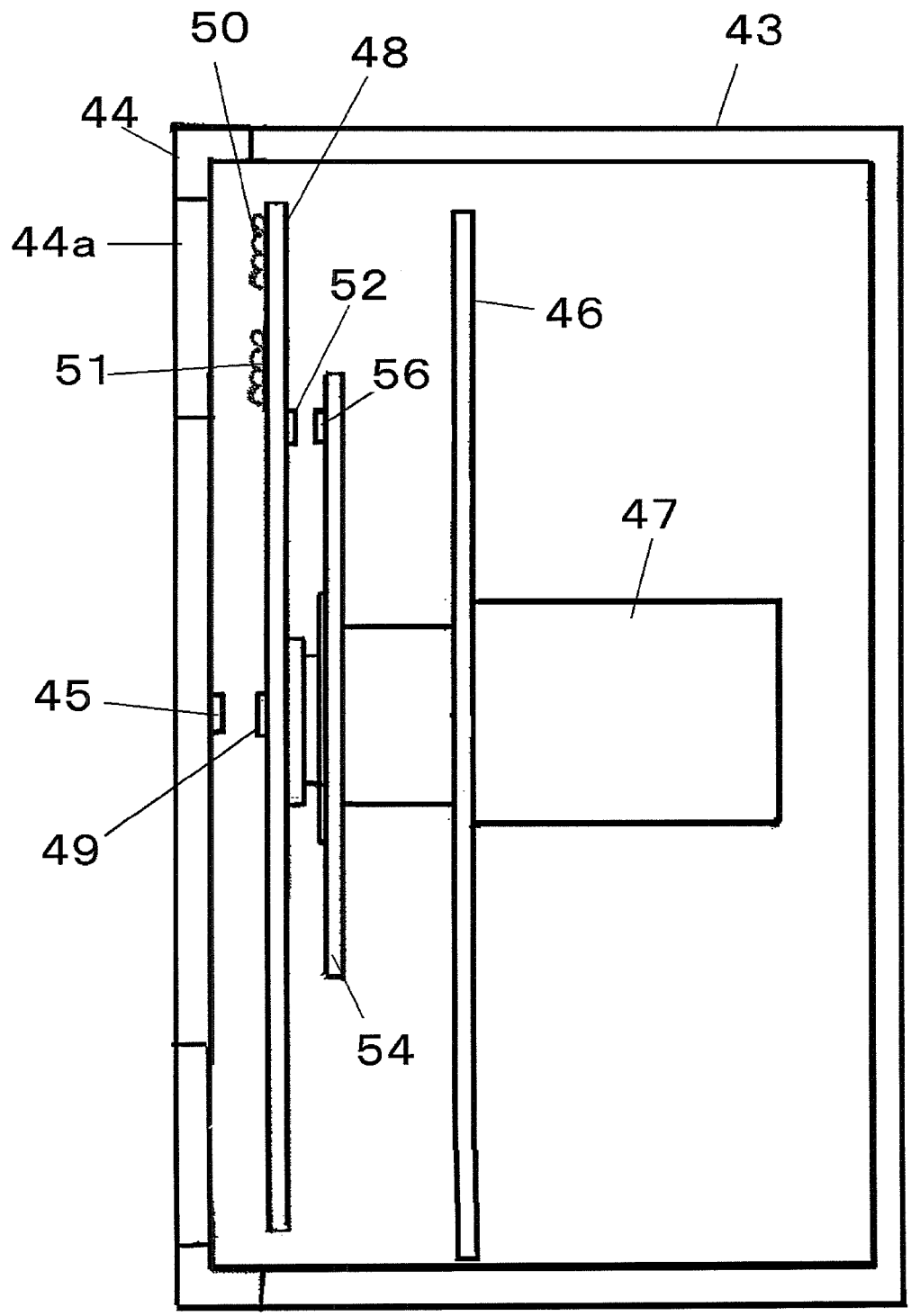
FIG. 9 shows a sectional view of the flasher type fish sonar in the second embodiment of the present invention.

FIG. 8 shows a perspective and blow apart view of a display device 43 of the flasher type fish sonar according to a second embodiment of the present invention and FIG. 9 shows a sectional view of the constructed display device 43. In the present embodiment, the display signal transmitting portion 27 transmits the signals by the light emitting diode and the light receiving diode and a signal transmitting element 45 is mounted on the center of the display window 44a of the front case 44 of the display device 43. Light emitting signals from signal transmitting element 45 are received by a signal receiving element 49 of the display rotary disc 48 fixed on a rotary shaft 47a of a motor 47 attached to a main board 46. As shown in FIG. 9, the receiving signals become light emitting signals of display light emitting diodes 50 and 51 opposite to the display window 44a of the front case 44 through the sonar display portion 31 and the letter illustration numeral display portion 30 by the display control portion 29.

Also, a connecting board 54 opposite to the display rotary disc 48 is fixed with the main board 46 as one body. A receiving electric coil 53 is mounted to the periphery of a signal receiving element 49 of the display rotary disc 48. The receiving electric coil 53 supplies electric power to the electric power portion, which supplies the electric power to the display control portion 29, the letter illustration numeral display portion 30 and the fish sonar display portion 31, and the receiving electric coil 53 is mounted opposite to a transmitting electric coil 55.

In flasher type fish sonar in the present invention as constructed by the above, after the reflected signals of the ultrasonic wave emitted in the water from the ultrasonic transducer 19 are memorized in the first buffer memory 22 once, the sea bottom signal is detected from the reflected signals read out from the first buffer memory 22. The display data formed by the reflected signals with the letter data from the display letter data memorizing portion 25 are memorized by the second buffer memory 26 and are supplied to the display control portion 29 of the display portion 28 from the display transmitting portion 27. The display data read out from the second buffer memory 26 in the display signal transmitting portion 27 are received by the signal receiving element 49 by light emitting from the signal light emitting element 45.

Since these light receiving signals are controlled by the display control portion 29 and are supplied to the display light emitting diodes 50 and 51 of the display rotary disc 48 from the letter illustration numeral display portion 30 and the fish sonar display portion 31, the display light emitting diodes 50 and 51 emit light, as shown in FIG. 7, outside of the display window 44a of the front case 44. As a result, the starting line A is displayed, a fish echo B is displayed next, the sea bottom C (a first reflected wave) is displayed, and a next sea bottom D (a second reflected wave) is displayed. The letters, illustrations and numerals are displayed by the display light emitting diode 51 in the inside of the display window 44a. Also, the electric power is supplied by the transmitting electric coil 55 and the receiving electric coil 53, and the position of the display rotary disc 48 is detected by the light receiving coil 52 mounted to the display rotary disc 48 and the light emitting element 56 mounted the connection board 54, whereby a contact portion as brushes and slip rings are not provided, and vibration and noise are not generated.

Figure 10:
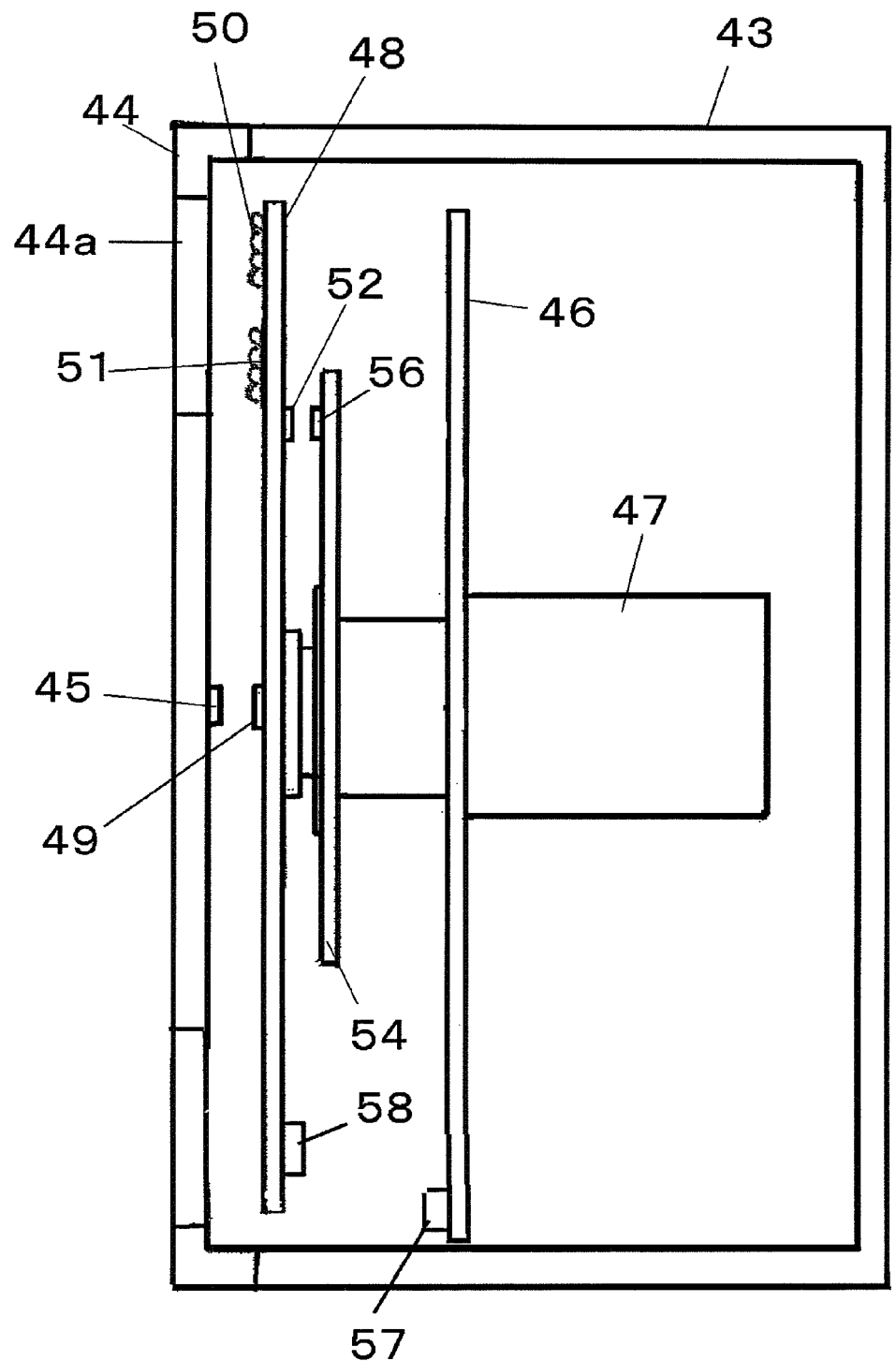
FIG. 10 shows a sectional view of the flasher type fish sonar in the third embodiment of the present invention.

FIG. 10 shows a sectional view of the flasher type fish sonar according to a third embodiment of the present invention. An electric wave transmitting circuit 57 is mounted to the main board 46, and an electric wave receiving circuit 58 is mounted the display rotary disc 48 instead of the signal transmitting element 45 and the signal receiving element 49.

In the flasher type fish sonar in the present invention, since the motion of the present embodiment is the same except for the motion of the transmitter of the display signals, the explanation of this motion is omitted. The display signals are transmitted by converting the electric wave by the electric wave transmitting circuit 57, the electric waves transmitted are received by the electric wave receiving circuit 58 mounted to the display rotary disc 48 and the converted display signals are transmitted to the display control portion 29.

What is claimed is:

1. A flasher type fish sonar comprises:
a front case in which a display window is formed in a front portion thereof,
a display rotary disc opposite to the display window, the rotary disc rotated by a motor,
an ultrasonic transducer for transmitting ultrasonic waves in water by a control portion and for receiving reflected signals in the water,
a display signal transmitting portion for transmitting reflected signals received by the ultrasonic transducer and display data formed by a control portion, to a display control portion attached to the rotary disc,
a fish sonar display portion displayed by light emitting diodes attached near an edge of the rotary disc, and for displaying fish sonar data in response to the display control portion, and
a letter illustration numeral display portion displayed by light emitting diodes inside of a center portion of the rotary disc, and for displaying letter illustration numeral display in response to the display control portion,
wherein, in the display signal transmitting portion, there are provided three slip rings for power supply, for ground and for signals attached to a rotary shaft of the display rotary disc, the brushes are contacted with three slip rings, and a second buffer memory is connected to these brushes.

2. A flasher type fish sonar as set forth claim 1 wherein the display control portion is constructed by a central processing unit (CPU).

3. A flasher type fish sonar comprises:
a front case in which a display window is formed in a front portion thereof,
a display rotary disc opposite to the display window, the rotary disc rotated by a motor,
an ultrasonic transducer for transmitting ultrasonic waves in water by a control portion and for receiving reflected signals in the water,
a display signal transmitting portion for transmitting reflected signals received by the ultrasonic transducer and display data formed by a control portion, to a display control portion attached to the rotary disc,
a fish sonar display portion displayed by light emitting diodes attached near an edge of the rotary disc, and for displaying fish sonar data in response to the display control portion, and
a letter illustration numeral display portion displayed by light emitting diodes inside of a center portion of the rotary disc, and for displaying letter illustration numeral display in response to the display control portion,
wherein the display signal transmitting portion comprises:
a signal transmitting element mounted in a center of the display window,
a signal receiving element mounted at a center of the rotary disc,
an electric receiving coil mounted at a center of the rotary disc, and
a transmitting coil set at a center portion of a fixed board opposite to the receiving coil,
wherein a second buffer memory is connected to the signal transmitting element for transmitting display signals, and electric power is supplied to the rotary disc by electromagnets of the transmitting coil and the receiving coil.

4. A flasher type fish sonar as set forth claim 3 wherein the display control portion is constructed by a central processing unit (CPU).

5. A flasher type fish sonar comprises:
a front case in which a display window is formed in a front portion thereof,
a display rotary disk opposite to the display window, the rotary disk rotated by a motor,
an ultrasonic transducer for transmitting ultrasonic waves in water by a control portion and for receiving reflected signals in the water,
a display signal transmitting portion for transmitting reflected signals received by the ultrasonic transducer and display data formed by a control portion, to a display control portion attached to the rotary disc,
a fish sonar display portion displayed by light emitting diodes attached near an edge of the rotary disc, and for displaying fish sonar data in response to the display control portion, and
a letter illustration numeral display portion displayed by light emitting diodes inside of a center portion of the rotary disc, and for displaying letter illustration numeral display in response to the display control portion
wherein the display signal transmitting portion comprises an electric power receiving coil provided in a center portion of the rotary disc, and the output of a second buffer memory is transmitted as an electric wave, by an electric wave transmitting circuit, and display signals received by an electric receiving circuit are supplied to the display control portion and are displayed.

6. A flasher type fish sonar as set forth claim 5 wherein the display control portion is constructed by a central processing unit (CPU).

* * * * *